United States Patent [19]

Helfritch et al.

[11] Patent Number: 4,985,219

[45] Date of Patent: Jan. 15, 1991

[54] REMOVAL OF NITROGEN OXIDES FROM WASTE GASES

[75] Inventors: Dennis J. Helfritch, Flemington; Philip C. Efthimion, Bedminster, both of N.J.

[73] Assignee: Research-Cottrell, Inc., Somerville, N.J.

[21] Appl. No.: 480,083

[22] Filed: Feb. 14, 1990

[51] Int. Cl.$^5$ .............................................. C01B 21/00
[52] U.S. Cl. .................................................. 423/235
[58] Field of Search .................... 423/235, 235 D, 239, 423/239 A

[56] References Cited

U.S. PATENT DOCUMENTS

| | | | |
|---|---|---|---|
| 2,975,025 | 3/1961 | Cohn et al. | 23/2 |
| 3,232,885 | 2/1966 | Henke | 252/372 |
| 3,279,884 | 10/1966 | Nonnenmacher et al. | 23/2 |
| 3,449,063 | 6/1969 | Griffing et al. | 23/2 |
| 3,826,810 | 7/1974 | Lawson | 423/212 |
| 3,846,981 | 11/1974 | Paczkowski | 60/286 |
| 4,393,031 | 7/1983 | Henke | 423/239 |

FOREIGN PATENT DOCUMENTS

| | | | |
|---|---|---|---|
| 608685 | 11/1960 | Canada | 423/239 |
| 668384 | 8/1963 | Canada | 23/281 |
| 787836 | 6/1968 | Canada | 31/96 |

OTHER PUBLICATIONS

Chemical Abstracts, vol. 104, p. 56994K–Trevault 1985.
W. Bartok and B. A. Folsom, "Control of $NO_x$ and $SO_2$ Emissions by Gas Reburning-Sorbent Injection", Proceedings AIChE Annual Meeting, Nov. 1987.
Q. N. Le and M. Vanpee, "Free Radical Concentration Measurements in Nitric Oxide-Acetylene Flames", Combustion and Flame, vol. 62, 1985, pp. 193-210.
H. W. Leutner and C. S. Stokes, "Producing Acetylene in a Plasma Arc", Industrial and Engineering Chemistry, vol. 53, No. 5, May 1961, pp. 341-342.

Primary Examiner—Gregory A. Heller
Attorney, Agent, or Firm—Kerkam, Stowell, Kondracki & Clarke

[57] ABSTRACT

A method for the removal of nitrogen oxides from waste gases by contacting the waste gas with the products of the pyrolytic decomposition of methane containing CH and $CH_2$ radicals to reduce the nitrogen oxides to nitrogen.

9 Claims, 1 Drawing Sheet

REMOVAL OF NITROGEN OXIDES FROM WASTE GASES

BACKGROUND OF THE INVENTION

1. Field of the Invention

The present invention relates to the removal of nitrogen oxides from waste gases.

2. Description of the Prior Art

A substantial amount of research has been directed at efforts to eliminate or reduce the nitrogen oxide [$NO_x$] content of waste gases emanating from boilers, engines, turbines and other systems which incorporate combustion processes involving the introduction therein of air consisting of nitrogen ($N_2$) and oxygen ($O_2$). Products of these combustion processes include nitrogen, carbon dioxide ($CO_2$), carbon monoxide ($CO$), water ($H_2O$), unburned oxygen, unburned fuel and $NO_x$.

The oxides of nitrogen are particularly undesirable in exhaust effluents because of their highly corrosive nature. They contribute greatly to "acid rain" and air pollution problems.

Efforts to reduce or eliminate $NO_x$ from waste gases can be categorized into two types of techniques. The first involves modification of the combustion process itself to reduce the amount of $NO_x$ produced.

The second type involves treatment of the waste gas itself to either remove the $NO_x$ from the waste gas effluent or to convert it to a less noxious form.

Examples of the latter technique include the catalytic reduction of $NO_x$ to nitrogen utilizing reducing agents such as methane, ammonia, etc. U.S. Pat. Nos. 3,846,981; 3,826,810; 3,449,063; 3,279,884; 2,975,025; 3,232,885 and Canadian Patents 668,384 and 787,836 are exemplary of the prior art describing these techniques. They suffer from the disadvantage that they require expensive and sensitive catalysts which are subject to poisoning and destruction at the temperatures generated by the reduction processes.

An example of the former type of $NO_x$ control, i.e., modification of the combustion process itself, is the so-called "fuel-staging" or "gas-reburning" techniques which involve introduction of methane into the fuel itself. The combustion process produces hydrocarbon fragments or radicals which can reduce $NO_x$ to $N_2$. The disadvantages of fuel staging are that the methane must be injected into the combustion zone and that most of the methane is consumed in reactions with oxygen.

The reactions in fuel staging which lead to the reduction of $NO_x$ to $N_2$ are as follows:

$$CH + NO \rightarrow HCN + O$$

$$CH_2 + NO \rightarrow HCN + OH$$

$$HCN + OH \rightarrow HNCO + H$$

$$HNCO + H \rightarrow NH_2 + CO$$

$$HNCO + H \rightarrow NCO + H_2$$

$$NCO + H \rightarrow NH + CO$$

$$NO + NH_2 \rightarrow N_2 + H_2O$$

$$NO + NH \rightarrow N_2 + OH$$

It can be seen that the success of such a NO reduction pathway depends on the generation of an adequate supply of CH and $CH_2$ radicals. These radicals are supplied by the "reburning gas", which is generally methane, due to its availability and low price. In practice it has been found that in order to achieve adequate NO reduction, as much as 20% of the total combustion heat release must be supplied by the injected methane [Bartok et al, "Control of $NO_x$ by Fuel Staging", Proceedings of the 1987 Joint Symposium on Stationary Combustion $NO_x$ Control, March, 1987]. An examination of the reaction pathways of $C_1$ and $C_2$ hydrocarbons can demonstrate why this is the case. The reactions of methane with oxygen lead to CO through reactions of the type:

$$CH_4 + O \rightarrow CH_3 + OH$$

$$CH_3 + O \rightarrow CH_2O + H$$

$$CH_2O + \rightarrow CHO + OH$$

$$CHO + O \rightarrow CO + OH$$

Thus, reactions with oxygen do not yield the CH and $CH_2$ radicals necessary for NO reduction. The only reactions leading to these radicals are those involving hydrogen which produce acetylene as a precursor to CH and $CH_2$. It is thus clear that when methane is simply burned, a large percentage of it follows a pathway to CO which does not produce CH or $CH_2$ radicals as intermediate products.

One way to improve the utilization of the reburn gas is to directly utilize acetylene. The fact that acetylene directly reacts with nitric oxide was demonstrated by Q. Le and M. Vanpee ["Free Radical Concentration Measurements in Nitric Oxide—Acetylene Flames", Combustion and Flame, Vol. 62, pp. 193–210 (1985)] who stabilized a $C_2H_2$—NO low-pressure burner. The stoichiometric balance for this reaction was 17% $C_2H_2$ and 83% NO. Richer fuel burns were also considered (27% $C_2H_2$ and 73% NO). Their flames produced long-lived free radicals of OH, CN, $C_2$, CH, and NH.

Parker and Wolfard [Fourth Symposium on Combustion, The Combustion Institute, pp. 420–428 (1952)] investigated the characteristics of flames supported by NO and $NO_2$. The burning velocities of different hydrocarbons with NO and $NO_2$ were measured and compared. The burning velocity is indicative of the relative reaction rates for each burn. It was found that the acetylene reactions have the highest velocities for all of the hydrocarbon reactions with NO and $NO_2$. In addition, the acetylene reactions have the smallest quenching diameters which suggests that the temperature at which the reaction begins in the flame front is very high. Therefore, contrary to general belief, flames are readily obtained with NO provided the conditions take into account the large quenching diameters and high ignition energies which are involved.

Experiments were conducted by Shaub and Bauer ["The Reduction of Nitric Oxide During the Combustion of Hydrocarbons: Methodology for A Rational Mechanism", Combustion and Flame, Vol. 32, pp. 35–55 (1978)] with shock tubes to study the reaction of NO with acetylene and other hydrocarbons. They found that CH and $CH_2$ radicals are important radical intermediates in the destruction of NO with acetylene.

These studies indicate that acetylene can be utilized for $NO_x$ emission control. The reburning can be conducted near the main heat release zone, or in the exhaust duct with the reheating facilitated with an atmospheric plasma source. Furthermore, it has been shown that acetylene is more effective than methane in destroying nitrogen oxides.

A disadvantage in using acetylene in reburning instead of methane is that acetylene can only be obtained in small steel cylinders of 300 liter volume, because of its inherent volatility. To obtain large quantities of the gas, many such steel cylinders are required which keeps the price of the gas very high, and not commercially attractive. This is why acetylene is primarily used for a cutting and welding torch fuel, and not for combustion applications.

It is an object of the present invention to provide a method for the removal of nitrogen oxides from waste gases which is not subject to the abovenoted disadvantages.

SUMMARY OF THE INVENTION

These and other objects are realized by the present invention which provides a method for the removal of nitrogen oxides from a waste gas containing nitrogen oxides comprising contacting the waste gas with the products of the pyrolytic decomposition of methane, the pyrolytic decomposition products consisting essentially of CH and $CH_2$ radicals and the contact between the waste gas and the pyrolytic decomposition products being effected for a time and at a temperature sufficient for the CH and $CH_2$ radicals to substantially reduce the nitrogen oxides to nitrogen.

DETAILED DESCRIPTION OF THE INVENTION

Figure 1:
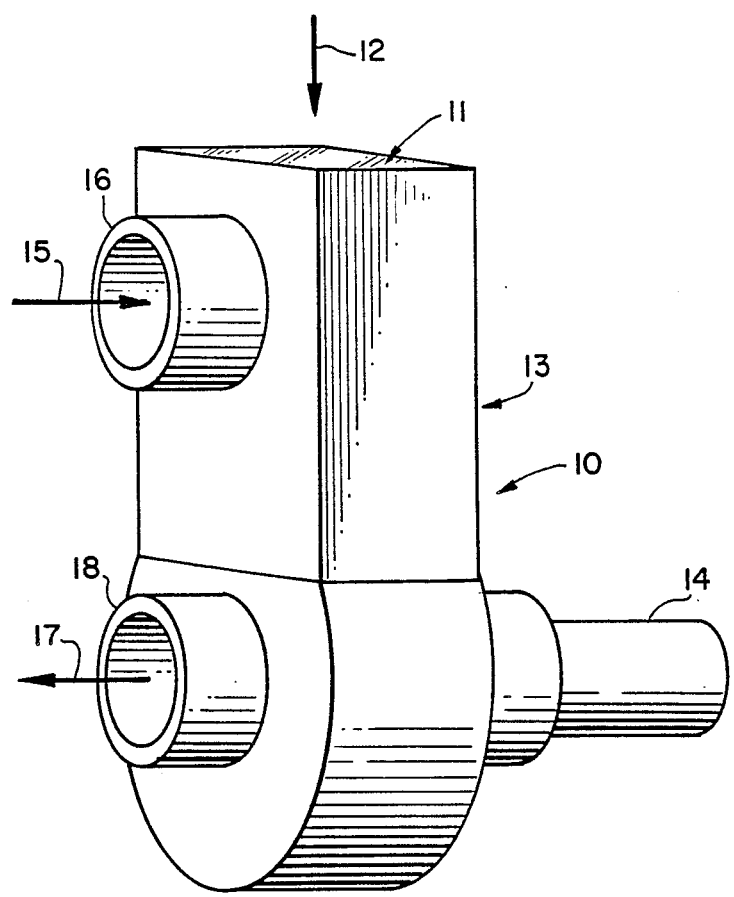
FIG. 1 in a perspective view of a cylindrical resonant cavity which can be used in the practice of the method of the invention.

The present invention is predicated on the discovery that an abundant supply of CH and $CH_2$ radicals can be efficiently produced by the pyrolytic decomposition of methane and that contacting the CH and $CH_2$ radical containing mixture with waste gas effluents containing $NO_x$ substantially reduces the $NO_x$ content thereof to $N_2$ in a highly advantageous and cost-effective manner.

It will be understood by those skilled in the art that by the term "pyrolysis" is meant decomposition of the methane at elevated temperatures in the substantial absence of oxygen and oxygen radicals.

Contact between the methane pyrolysis product and waste gas can be conducted under conditions which ensure intimate admixture therebetween and at temperatures and for a time which ensure substantial reduction of the $NO_x$ content of the waste gas to $N_2$.

Generally, temperatures in the range of from about 100° C. to about 1000° C. and reaction times of from about 0.1 sec. to about 1.0 sec. are sufficient to ensure removal of substantially all of the $NO_x$ from the waste gases.

The method of the invention is applicable to the reduction of $NO_x$ gases in virtually any waste gas but is particularly adapted for the treatment of waste gases emanating from boilers, engines, turbines and any system incorporating combustion processes involving the introduction of air into the combustion zone. The invention is particularly adapted to the treatment of flue gases.

It is preferred to produce the CH and $CH_2$ radical containing gas in a plasma jet. The use of plasma jets has been reported in the literature [Leutner et al, "Producing Acetylene in a Plasma Arc," Industrial and Engineering Chemistry, Vol. 53, No. 5, pp. 341–342, (May 1961)].

In a preferred embodiment of the invention, methane is pyrolyzed in a plasma jet generated in a microwave cavity.

By means of a resonant cavity, microwave power can be concentrated into extremely large energy density. The high field strength obtained within a resonant cavity results in gaseous ionization and the production of a high temperature plasma. A typical electromagnetic cavity consists of an enclosed structure made of conducting walls. These structures have the unique property of being able to store electromagnetic energy for time intervals longer than the wave time period. Cavities have these properties only at special frequencies determined by the dimensions of the cavity and the particular cavity mode excited. This frequency is called the resonant frequency.

A plasma will exist within the resonant cavity when there is a steady state population of free electrons which can absorb the incident microwave power. In order to achieve a stable electron density, the rate of electron production through gaseous ionization must equal the rate of electron loss through recombination, diffusion, etc. The rate of ionization through electron-molecule collision depends on the density of high energy electrons, which in turn depends on the electric field strength within the cavity, which accelerates the electrons. For gases at atmospheric pressure, plasma initiation is achieved at a field strength of approximately 30KV/cm.

A cylindrical cavity is capable of supporting a number of transverse magnetic ($TM_{nml}$) and transverse electric ($TE_{nml}$) resonances. The $TM_{010}$ cavity is the simplest cylindrical geometry which can be constructed and a typical structure 10 is shown in FIG. 1. The microwave energy is introduced through microwave window 11 into the interior of resonant cavity 10 by means of standard waveguide components 13. Fine tuning to achieve resonance is accomplished by means of a tungsten rod 14 which can be moved into the cavity 18 volume. The process gas represented by arrow 15 flows through inlet 16 into the waveguide. Pyrolyzed gas, represented by arrow 17, exits via outlet 18 at the cylinder centerline. The discharge is formed in the high electric field zone within the cavity at the centerline.

The pyrolysis of methane in the plasma jet is preferably conducted at a temperature of from about 5,000° C. to about 10,000° C. in the substantial absence of oxygen and oxygen radicals. To ensure the absence of oxygen and oxygen radicals, it is necessary to exclude from the plasma air, oxygen and materials which would yield oxygen and oxygen radicals under the conditions of pyrolysis, e.g., water, carbon dioxide, etc..

The expulsion of waste gas into the atmosphere treated in accordance with the method of the invention substantially reduces the risk of air pollution therefrom due to $NO_x$ gases which have been substantially reduced to nitrogen.

We claim:

1. A method for the removal of nitrogen oxides from a waste gas containing nitrogen oxides comprising contacting said waste gas with the products of the pyrolytic decomposition of methane, said pyrolytic decomposition products consisting essentially of CH and $CH_2$ radicals and said contact between said waste gas and said pyrolytic decomposition products being effected at a temperature of from about 100° C. to about 1,000° C. and for a time sufficient for said CH and $CH_2$ radicals to substantially reduce said nitrogen oxides to nitrogen.

2. The method of claim 1 wherein said contact between said decomposition products and said waste gas is effected for a time of from about 0.1 to about 1.0 seconds.

3. The method of claim 1 wherein said waste gas is flue gas.

4. The method of claim 1 wherein said methane decomposition products are produced by the pyrolysis of methane in a plasma jet at a temperature of from about 5,000° to about 10,000° C. in the substantial absence of oxygen and oxygen radicals.

5. The method of claim 4 wherein said methane plasma is generated in a microwave cavity.

6. A method for the removal of nitrogen oxides from a waste gas containing nitrogen oxides comprising:

forming a plasma jet of a gas consisting essentially of methane and substantially excluding oxygen and oxygen radicals at a temperature of from about 5,000° to about 10,000° C. whereby said methane is pyrolytically decomposed to produce an effluent gas consisting essentially of CH and $CH_2$ radicals;

injecting said effluent gas into said waste gas in a reaction zone at a temperature of from about 100° to about 1,000° C. and maintaining contact between said effluent and said waste gas in said reaction zone for a time sufficient for said CH and $CH_2$ radicals to reduce said nitrogen oxides in said waste gas to nitrogen, and expelling said waste gas containing substantially reduced amounts of nitrogen oxides from said reaction zone.

7. The method of claim 6 wherein contact between said effluent and said waste gas in said reaction zone is maintained for from about 0.1 to about 1.0 seconds.

8. The method of claim 6 wherein said plasma jet is generated in a microwave cavity.

9. The method of claim 6 wherein said waste gas is a flue gas.

* * * * *